US012673444B2

(12) United States Patent
Roux et al.

(10) Patent No.: US 12,673,444 B2
(45) Date of Patent: Jul. 7, 2026

(54) SYSTEM FOR EXTRUDING CEMENTITIOUS MATERIAL BEADS FOR AN ARCHITECTURAL STRUCTURE ADDITIVE MANUFACTURING ROBOT

(71) Applicant: XtreeE, Rungis Cedex (FR)

(72) Inventors: Philippe Roux, Rungis Cedex (FR);
Alban Mallet, Rungis Cedex (FR);
Charles Bouyssou, Rungis Cedex (FR);
Mahriz Akhavan Zakeri, Rungis Cedex (FR); Laurent Blanchet, Rungis Cedex (FR); Philippe Morel, Rungis Cedex (FR); Clément Gosselin, Rungis Cedex (FR); Nadja Gaudilliere, Rungis Cedex (FR); Romain Duballet, Rungis Cedex (FR)

(73) Assignee: XTREEE, Le Manille (FR)

( * ) Notice: Subject to any disclaimer, the term of this patent is extended or adjusted under 35 U.S.C. 154(b) by 650 days.

(21) Appl. No.: 16/622,777

(22) PCT Filed: Jun. 12, 2018

(86) PCT No.: PCT/FR2018/051370
§ 371 (c)(1),
(2) Date: Dec. 13, 2019

(87) PCT Pub. No.: WO2018/229418
PCT Pub. Date: Dec. 20, 2018

(65) Prior Publication Data
US 2021/0146573 A1      May 20, 2021

(30) Foreign Application Priority Data

Jun. 14, 2017    (FR) ...................................... 1755380

(51) Int. Cl.
B28B 1/00       (2006.01)
B28B 17/00      (2006.01)
(Continued)

(52) U.S. Cl.
CPC .......... B28B 1/001 (2013.01); B28B 17/0081 (2013.01); B33Y 30/00 (2014.12); B33Y 50/02 (2014.12)

(58) Field of Classification Search
CPC ..... B28B 1/001; B28B 17/0081; B28B 3/222; B33Y 30/00; B33Y 50/02; E04G 21/04;
(Continued)

(56) References Cited

U.S. PATENT DOCUMENTS

2014/0252668 A1*  9/2014  Austin ................ B28B 17/0081
                                                          425/375
2018/0036693 A1*  2/2018  Dubey .................. B28C 5/1276
(Continued)

FOREIGN PATENT DOCUMENTS

CN       204354263        5/2015
CN       105216333    *   1/2016   ............. B29C 67/00
(Continued)

OTHER PUBLICATIONS

Jesse.M Pope, The Effects of Pipewall Offsets on Water Meter Accuracy, DigitalCommons@USU, May 2014, p. 1 (Year: 2014).*

*Primary Examiner* — Susan D Leong
(74) *Attorney, Agent, or Firm* — CRGO Global; Steven M. Greenberg

(57)                    ABSTRACT

The invention relates to a system for extruding cementitious material beads for a robot used for the additive manufacturing of architectural structures, comprising: a head for depositing beads of cementitious material, referred to as printhead, comprising an inlet mouth and an outlet nozzle configured to form beads of cementitious material; a feed (Continued)

Figure 1:
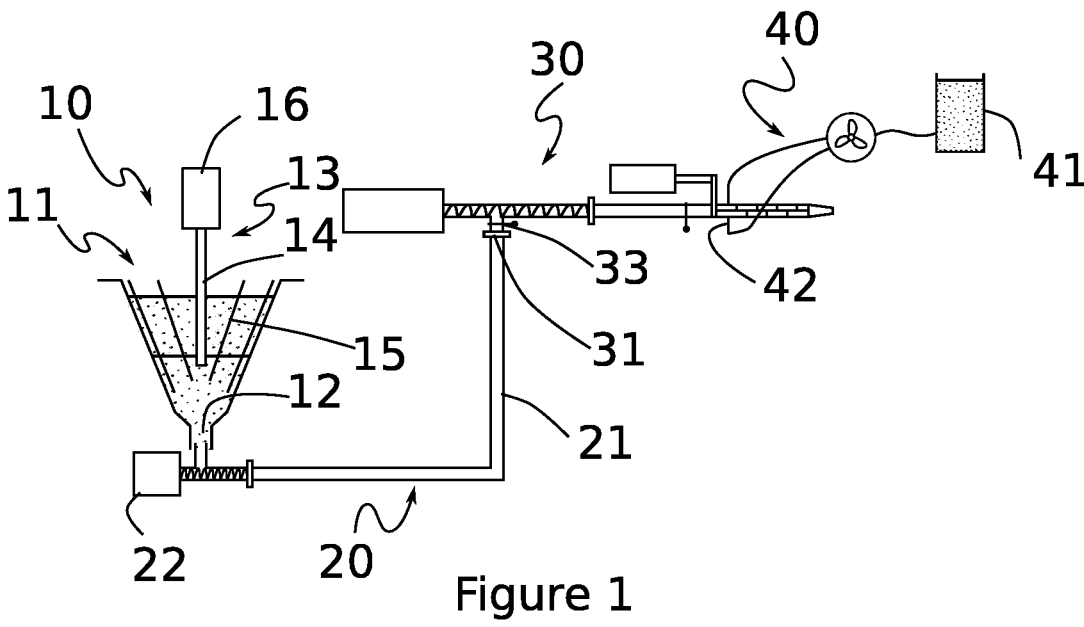

circuit for the printhead, comprising a reservoir for storing cementitious material, a feed conduit connecting the storage reservoir to said printhead, and a booster pump for said feed conduit, characterized in that it further comprises a sensor for sensing the pressure rate of the cementitious material flowing in said printhead, and suitable for transmitting pressure/flow rate measurements to said booster pump, and in that the booster pump is configured to control the boosting of the feed conduit on the basis of the measurements transmitted by the sensor.

9 Claims, 2 Drawing Sheets

(51) Int. Cl.
B33Y 30/00 (2015.01)
B33Y 50/02 (2015.01)

(58) Field of Classification Search
CPC .... B01F 5/0473; B01F 5/048; B01F 7/00908; B01F 15/0245; B28C 5/1253; B28C 7/161; B28C 7/163
See application file for complete search history.

(56) References Cited

U.S. PATENT DOCUMENTS

| | | | |
|---|---|---|---|
| 2018/0093373 A1 | 4/2018 | Niederberger | |
| 2019/0194072 A1* | 6/2019 | Esnault ................. | B33Y 70/00 |
| 2019/0308342 A1* | 10/2019 | Butler ................. | E04G 21/0436 |
| 2020/0070404 A1* | 3/2020 | Bruggeman ........... | B33Y 10/00 |
| 2022/0176621 A1* | 6/2022 | Leibig ................... | B33Y 80/00 |

FOREIGN PATENT DOCUMENTS

| | | |
|---|---|---|
| CN | 205840350 | 12/2016 |
| GB | 2267110 | 11/1993 |
| JP | H04269299 | 9/1992 |

* cited by examiner

SYSTEM FOR EXTRUDING CEMENTITIOUS MATERIAL BEADS FOR AN ARCHITECTURAL STRUCTURE ADDITIVE MANUFACTURING ROBOT

CROSS-REFERENCE TO RELATED APPLICATIONS

This application is a § 371 national phase entry of International Application No. PCT/FR2018/051370, filed Jun. 12, 2018, which claims priority to French Patent Application No. 1755380, filed Jun. 14, 2017.

1. TECHNICAL FIELD OF THE INVENTION

The invention relates to the additive manufacturing of cementitious materials. The invention relates in particular to a system for extruding strands of cementitious material for a robot used for the additive manufacturing of architectural structures. The invention also relates to a robot provided with such a system for the additive manufacturing of architectural structures.

2. TECHNOLOGICAL BACKGROUND 3D printing of cementitious materials is a sector of the industry for the additive manufacturing of cementitious materials of which the applications appear to be numerous and promising in the field of architecture and construction.

Indeed, 3D printing of cementitious materials appears to be able to offer many advantages over traditional techniques, including in particular the possibility of being able to produce complex shapes by adding successive layers of cementitious materials, the speed of construction operations, the reduced costs and manpower, improved safety on construction sites, etc.

The mastery of 3D printing of cementitious materials calls for skills in the field of fluid mechanics, mechanics, electronics and civil engineering.

Throughout the text, the term "architectural structures" refers to individual structural elements (bridge, pillar, wall, street furniture, etc.), complete structures (building, house, apartment block, etc.) and various architectural parts (artistic works, sculptures, etc.).

The extrusion of cementitious material intended for the manufacture of an architectural structure involves a cementitious print head comprising an inlet for cementitious material and a nozzle for the outlet of cementitious material, and a circuit for feeding the print head with cementitious material, comprising a cementitious material storage tank, a pipe connecting the storage tank and the inlet of the print head, and a pump for filling the pipe with the cementitious material from the storage tank.

One of the difficulties of 3D printing of cementitious materials lies in the fact that the cementitious material has to be provided in a rheological state compatible with pumping of this material, i.e. the material has to be sufficiently fluid to be able to be pumped from the storage tank and conveyed to the outlet nozzle, while its state has to be quite viscous (i.e. less fluid) downstream of the outlet nozzle to be able to form a self-supporting layer that is capable of supporting the next layer.

Cement printing systems already exist. This being so, it has been found that the proposed systems do not allow in particular the presence of excessive overhangs in the printed product (the structure produced) unless the printing operations are greatly slowed down, which creates discontinuities, or unless temporary reinforcements are added, which slows and complicates the printing. One of the reasons for the difficulties of the previous solutions lies in the fact that the cementitious material is placed in a state close to its pumping limit while having a shear threshold sufficient for it to not sag. This constraint on the material entails a heavy constraint on the printing speed of the manufactured part by limiting the output and speed of the robot, and thus limits the complexity of the produced part to the strength of the extruded material.

3. AIMS OF THE INVENTION

The inventors have therefore sought to provide a system for extruding cementitious material that makes it possible to solve at least some of the disadvantages of prior solutions with the aim of being able to provide complex parts without impacting printing performance.

In particular, the inventors have sought to provide a solution that allows the use of a cementitious material similar to that which is cast in the context of traditional techniques (especially in terms of strength) without nevertheless requiring the presence of a mold or formwork.

The invention also aims to provide, in at least one embodiment, a system for extruding cementitious material which makes it possible to manufacture complex architectural or structural parts.

The invention also aims to provide, in at least one embodiment, an extrusion system that allows continuous and uniform dispensing of the material.

The invention also aims to provide, in at least one embodiment of the invention, an extrusion system which allows the printing of parts having overhangs without this resulting in the printing speed being slowed down, however.

The invention also aims to provide, in at least one embodiment of the invention, an extrusion system that allows the manufacture of architectural or structural parts in an accurate, stable and repeatable manner, and at low cost.

The invention also aims to provide a robot provided with a cementitious extrusion system according to the invention.

4. DISCLOSURE OF THE INVENTION

To this end, the invention relates to a system for extruding strands of cementitious material for a robot used for the additive manufacturing of architectural structures, comprising:
- a head for dispensing strands of cementitious material, referred to as a print head, comprising a mouth for the inlet of cementitious material and an outlet nozzle designed to form strands of cementitious material,
- a circuit for feeding cementitious material to said print head, comprising a cementitious material storage tank, a pipe connecting said storage tank and said print head, and a pump for filling said feed pipe with cementitious material from said storage tank,
- a sensor for detecting the pressure/flow rate of said cementitious material flowing in said print head, which sensor is suitable for transmitting pressure/flow rate measurements to said filling pump, said filling pump being designed to control the filling of the feed pipe on the basis of the measurements transmitted by said sensor.

A system according to the invention is characterized in that said dispensing head further comprises:
- a mixing chamber which is arranged upstream of said outlet nozzle and into which an admixing device leads which is suitable for injecting admixtures that modify the characteristics of the cementitious material before ejection of said strands of cementitious material through said outlet nozzle, a dynamic mixer designed to be able to mix said cementitious material and said admixtures provided by said admixing device in said mixing chamber, an eccentric-screw metering pump designed to be able to convey the cementitious material from the inlet mouth of the print head to said mixing chamber.

A system according to the invention thus makes it possible to convey the cementitious material from the storage tank to the printing head while monitoring and controlling the flow rate and the pressure of the cementitious material. The invention thus makes it possible to maintain the pressure of the cementitious material in a predetermined range of values at the inlet into the print head, for example between 2 and 6 bar. This control of the pressure and flow rate of the cementitious material in the print head allows continuous and uniform dispensing of the strands of cementitious material through the outlet nozzle. It is therefore possible with a system according to the invention to quickly obtain complex parts without imposing particular constraints on the material, other than the pressure and the flow rate of the cementitious material that feeds the nozzle of the print head. The control of the filling pump also makes it possible to correct any geometrical imperfections in the extrusion of the strands.

In addition, an extrusion system according to the invention comprises an admixing device which is connected to said print head upstream of said outlet nozzle so as to be able to inject admixtures that modify the characteristics of the cementitious material before ejection of said strands of the cementitious material through said outlet nozzle.

Such a system therefore makes it possible to modify the properties of the cementitious material by adding admixtures upstream of the outlet nozzle so as to be able to adapt the cementitious material ejected from the outlet nozzle to the needs of the architectural structure to be manufactured. It is therefore possible with a system according to the invention to convey the cementitious material to the print head in a state compatible with optimized pumping and to modify its physical properties (for example its rheology, surfactant strength, plasticity, stability, thixotropy, etc.) only before the layer is dispensed at the nozzle outlet.

It is therefore possible with a system according to the invention to dispense layers of cementitious material at the nozzle outlet which have characteristics close to the cementitious material used in the context of traditional construction techniques.

In other words, a system according to the invention makes it possible to use a cementitious material in a first rheological state at the inlet of the system (the storage tank), to convey this material in a controlled manner to the print head, which is itself intended to be attached to a 3D printing positioning system, such as an articulated arm, and to alter the rheological state of the material during this conveyance by the addition of admixtures. Thus, the system according to the invention makes it possible to monitor and to control the state of the material (rheology, flow rate, pressure) at the outlet of the print head.

In addition, the print head comprises a mixing chamber associated with a dynamic mixer for mixing the cementitious material and the admixtures homogeneously upstream of the outlet nozzle. The cementitious material is guided to the mixing chamber by an eccentric-screw metering pump, which allows the material to be conveyed to the chamber at a constant flow rate, without generating pulsations. In addition, said pump makes it possible to reduce any pulsations created by the filling pump.

Advantageously and according to the invention, the filling pump is an eccentric-screw pump so as to limit the pulsations in the feed pipe.

Nevertheless, in other embodiments the filling pump may be a peristaltic pump, a piston pump, and generally any pump suitable for conveying a cementitious material and for being controlled in terms of pressure/flow rate.

Advantageously and according to the invention, said dynamic mixer comprises at least one shaft extending longitudinally into the mixing chamber, and carrying radial fingers distributed along the shaft, and a motor designed to be able to rotate said shaft so as to be able to provide a homogeneous mixture of the cementitious material and the admixtures.

A system according to this advantageous variant makes it possible to obtain a homogeneous mixture of the cementitious material and the admixtures. The presence of radial fingers distributed along the shaft of the mixer allows the particles of material to be evenly distributed in the mixing chamber. According to one variant, the mixer comprises two parallel arms, each arm comprising radial fingers, so as to form an "eggbeater" type element. The mixer motor can be controlled so as to reverse its direction of rotation of the axis or axes during printing.

Advantageously and according to the invention, said admixing device comprises at least one admixing needle which leads into said mixing chamber in an admixing direction which forms an angle of between 0 and 90°—preferably 45°—with said longitudinal direction and is connected to an admixture barrel so as to be able to inject said admixtures from said admixture barrel into said mixing chamber in said admixing direction.

According to this variant, the admixtures are added to the cementitious material in the mixing chamber in an admixing direction which forms a predetermined angle with the longitudinal direction. Said longitudinal direction is the direction of the shaft of the mixer and the flow direction of the cementitious material into the mixing chamber. This injection of admixtures in said admixing direction makes it possible to rapidly obtain a homogeneous mixture of the cementitious material and the admixtures. Admixing at 90° is radial admixing which promotes the mixture of the admixtures with the cementitious material flowing in the vicinity of the central axis of the mixing chamber. Admixing close to 0° promotes the mixture of the admixtures with the material flowing in the vicinity of the walls of the mixing chamber. Admixing at 45° is a good compromise between the two angles described above.

Advantageously and according to this variant, said admixing device comprises a plurality of needles leading in the admixing direction into said mixing chamber, each needle being connected to said admixture barrel by means of a volumetric feeder.

According to this variant, a plurality of needles inject the admixtures into the mixing chamber in said admixing direction, which allows a homogeneous distribution of the admixtures into the cementitious material. Preferably, the needles are arranged in the vicinity of the upstream portion of the mixing chamber, i.e. opposite the outlet nozzle. Each needle is connected to the admixture barrel by means of a volumetric feeder, which makes it possible to control the flow rate of admixture injected into the mixing chamber. Thus, the cementitious material is guided into the mixing chamber at a constant flow rate, controlled by the filling pump which is controlled in terms of pressure/flow rate, and the admixtures are guided to the mixing chamber at a constant flow rate controlled by the volumetric feeders. Preferably, each volumetric feeder is connected to the needle by means of a Luer locking fitting, better known as a Luer lock.

Advantageously and according to the invention, said admixing device comprises a peristaltic pump arranged between the admixture barrel and said volumetric feeders.

The presence of a peristaltic pump makes it possible to improve the pumping of the admixtures, in particular in the case of a large distance, for example greater than 5 meters, between the admixture barrel and the needles of the admixing device. Of course, this distance from which a volumetric feeder is preferable depends on the type of volumetric feeder, the admixing circuit and the difference in height between the admixture barrel and needles.

Advantageously, an extrusion system according to the invention comprises a sensor for detecting the pressure of said cementitious material upstream of the mixing chamber, referred to as a safety sensor, which is designed to measure the pressure upstream of said mixing chamber so as to be able to prevent risks of the mixing chamber or the outlet nozzle clogging.

Advantageously and according to the invention, the storage tank of said feed circuit is a hopper comprising an upper opening for receiving batches of cementitious materials and a lower outlet connected to said feed pipe.

A hopper makes it easy to receive batches of cementitious materials provided by an operator. A hopper can also easily be fed by a device for producing the cementitious material which is arranged above the hopper.

Advantageously and according to this variant, said hopper is provided with an agitator comprising a shaft carrying a plurality of lateral blades, and a motor for rotating the shaft so as to be able to stir the cementitious material of said hopper.

The agitator makes it possible to maintain the cementitious material in an almost constant rheological state before pumping by the filling pump. In other words, this agitating hopper forms a buffer tank that can receive different batches of cementitious material. A hopper has a conical shape that makes it possible to keep track of the batches.

Advantageously, an extrusion system according to the invention has a constant cross section from the filling pump to the outlet nozzle so as to be able to convey the cementitious material without generating disturbance zones.

The invention also relates to a robot used for the additive manufacturing of architectural structures, comprising a positioning system, such as an articulated arm, controlled by a control unit, characterized in that it comprises a system for extruding cementitious material according to the invention.

Such a robot comprises an extrusion system according to the invention, the print head of which is carried by a positioning system, such as an articulated arm, which is itself controlled by a computer.

The invention also relates to an extrusion system and to a robot for additive printing characterized in combination by all or some of the features mentioned above or below.

5. LIST OF FIGURES

Figure 2:
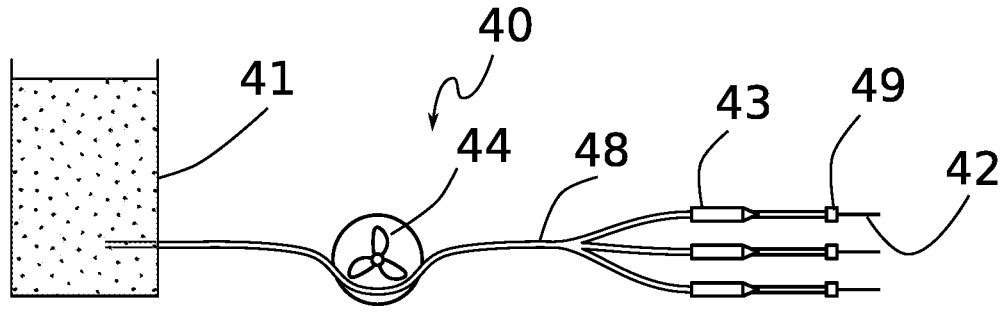
Figure 3:
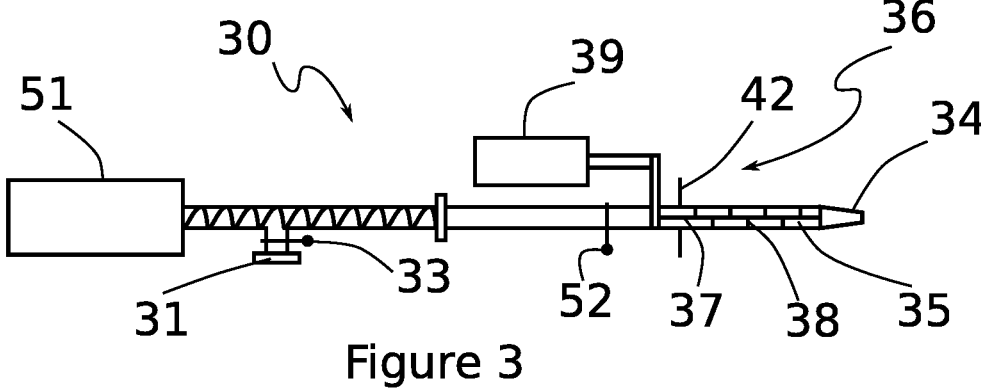
Figures 4A, 4B:
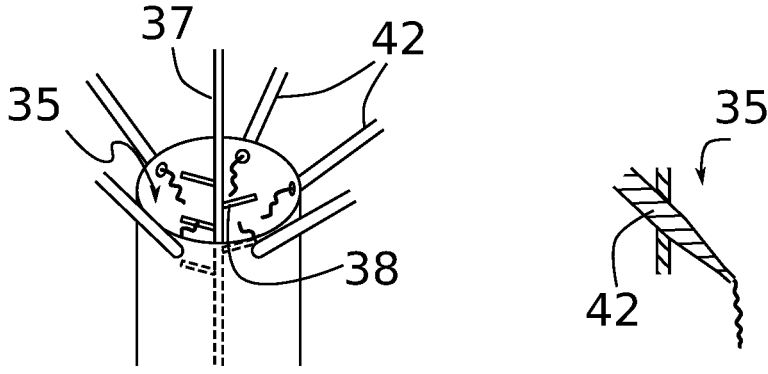
Figure 5:
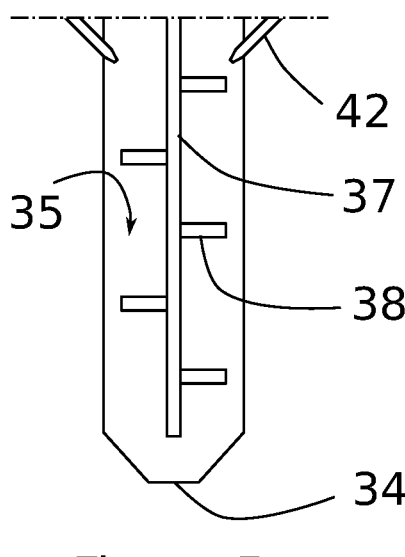

Further aims, features and advantages of the invention will become apparent upon reading the following description, which is provided solely by way of non-limiting example, and which refers to the accompanying figures, in which:

FIG. 1 is a functional schematic view of an extrusion system according to one embodiment of the invention, FIG. 2 is a functional schematic view of an admixing device of an extrusion system according to one embodiment of the invention, FIG. 3 is a functional schematic view of a print head of an extrusion system according to one embodiment of the invention, FIGS. 4a and 4b are partial schematic views of needles of an admixing device which lead into a mixing chamber of an extrusion system according to one embodiment of the invention, FIG. 5 is a schematic sectional view of a portion of the mixing chamber of an extrusion system according to one embodiment of the invention.

6. DETAILED DESCRIPTION OF ONE EMBODIMENT OF THE INVENTION

For the sake of illustration and clarity, the scales and proportions are not strictly adhered to in the figures. Throughout the following detailed description with reference to the figures, unless otherwise indicated, each element of the extrusion system is described as arranged when the extrusion system is in the configuration of FIG. 1.

In addition, identical, similar or analogous elements are denoted using the same reference signs throughout the figures.

An extrusion system according to the preferred embodiment of the invention, as shown in FIG. 1, comprises a cementitious material storage tank 10, a print head 30, a circuit 20 for feeding cementitious material to the print head arranged between the storage tank 10 and the print head 30, and an admixing device 40 connected to the print head 30.

Each of the various elements of the system will now be described in detail.

Storage Tank

The storage tank 10 is preferably a hopper comprising an upper opening 11 suitable for receiving batches of cementitious materials and a lower outlet 12 connected to the feed circuit 20. The hopper further comprises an agitator 13 comprising a shaft 14 carrying a plurality of lateral blades 15 by means of axes perpendicular to the shaft 14, and a motor 16 for rotating the shaft 14. The motor 16 is for example an electric motor designed to be able to drive the shaft 14 of the agitator 13 at low speed, for example at a speed of 6 revolutions/minute. The use of a heat engine is of course possible without modifying the performance of the extrusion system according to the invention. The role of the agitator is to be able to maintain the cementitious material in the hopper at an almost constant rheological state before being guided to the print head by the feed circuit 20.

The cementitious material used is for example a premix made from cement with fine particles, which is hydrated and fluidized.

Feed Circuit

The feed circuit 20 connects the storage tank 10 to the print head 30. Said circuit comprises a pipe 21 connecting the outlet 12 of the storage tank 10 to an inlet mouth 31 of the print head 30. The feed circuit 20 further comprises a filling pump 22. Said filling pump 22 is controlled in terms of pressure/flow rate by a pressure sensor 33 arranged in the vicinity of the inlet mouth 31 of the print head 30. Said filling pump 22 is for example an eccentric-screw pump so as to be able to convey the cementitious material to the print head 30 while minimizing pulsations. Said filling pump 22 is for example a pump marketed as Putzmeister® FP-V Mono. Of course, other pumps can be used without modifying the performance of the invention. The pressure/flow rate sensor 33 may be of any known type. It is for example a sensor marketed as ifm® PF2953. Of course, other sensors can be used without modifying the performance of the invention. The filling pump 22 is designed to follow a control law that is predetermined and can be set by an operator as required. For example, the control law is set to maintain the pressure of the cementitious material between 2 and 6 bar.

Print Head

The print head 30 comprises, as shown in FIG. 3, an inlet mouth 31 connected to the feed circuit 20 and an outlet nozzle 34 designed to form strands of cementitious material.

The print head further comprises a mixing chamber 35 which is arranged upstream of the outlet nozzle 34 and into which the admixing device 40, described below, leads. The mixing chamber 35 is provided with a dynamic mixer 36 suitable for being able to mix the cementitious material and the admixtures provided by the admixing device 40.

The dynamic mixer 36 comprises, as partially shown in FIGS. 4a and 5, a shaft 37 which extends longitudinally into the mixing chamber 35 and on which radial fingers 38 distributed along the shaft 37 are mounted. The dynamic mixer 36 also comprises a motor 39 designed to be able to rotate the shaft 37 so as to be able to provide a homogeneous mixture of the cementitious material and admixtures. This motor 39 may be an electric motor, a heat engine, and generally any type of motor. According to the embodiment in the drawings, the motor 39 is offset relative to the shaft 37 in order to minimize the disturbance of the mixture in the mixing chamber 35.

The print head 30 also comprises an eccentric-screw metering pump 51 designed to be able to convey the cementitious material from the inlet mouth 31 to the mixing chamber 35. Such a metering pump is for example a pump marketed as Viscotec® 3VMP36. Of course, other pumps can be used without modifying the performance of the invention.

According to another embodiment not shown in the figures, the metering pump 51 is replaced by a volumetric feeder designed to be able to ensure a constant flow rate over a predetermined operating range.

The print head 30 also comprises a safety pressure sensor 52 arranged upstream of the mixing chamber 35. This sensor is for example a sensor marketed as ifm® PF2953. Of course, other sensors can be used without modifying the performance of the invention. Said safety sensor 52 makes it possible to measure the pressure upstream of the mixing chamber 35 so as to be able to prevent risks of the mixing chamber 35 or the outlet nozzle 34 clogging. Said sensor may for example be connected to an automatic shutdown system of the extrusion system as soon as a pressure threshold is reached.

The outlet nozzle 34 of the print head is preferably removable so as to be able to adapt the shape of the outlet nozzle 34 to the part to be manufactured. In particular, the cross section of the outlet nozzle 34 can be adapted to each type of manufactured part, and can even be changed during printing to modify the cross section of the strands of particular zones of the manufactured part. To this end, the outlet nozzle comprises, for example, a threaded outer wall which engages with a threaded inner portion of the wall of the print head delimiting the mixing chamber 35. According to another variant, the outlet nozzle comprises a threaded inner wall which engages with a threaded outer portion of the wall of the print head.

Admixing Device

The admixing device 40 comprises, as shown in FIG. 2, a barrel 41 containing a plurality of admixtures, needles 42 connected to the barrel 41 by means of pipes 48, volumetric feeders 43 and a peristaltic pump 44. The volumetric feeders are, for example, the dispensers marketed as Viscotec® eco-PEN600. Of course, other feeders can be used without modifying the performance of the invention. The admixtures of the admixture barrel 41 can be of any type. These are admixtures designed to modify any physical property of the cementitious material (mainly its rheology, but also its surfactant strength, plasticity, stability, thixotropy, etc.).

The needles 42 lead into the mixing chamber 35, opposite the outlet nozzle 34, in an admixing direction which forms for example an angle of 45° with the main direction of the mixing chamber.

The admixing is thus carried out by means of volumetric feeders which allow the admixtures to be pumped in liquid form into the barrel 41 and guided at a constant pressure into the mixing chamber 35. Each volumetric feeder 43 is connected to a precision needle 42 by means of a Luer lock device 49. The arrangement of the needles 42 in an admixing direction which preferably forms an angle of 45° with the main direction of the mixing chamber, which is the flow direction of the cementitious material, makes it possible to obtain a homogeneous mixture of the cementitious material and the admixtures. Thus, the cementitious material at a constant flow rate, obtained by means of the filling pump which is controlled in terms of pressure, comes into contact with the admixtures at a constant flow rate, obtained by means of the volumetric feeders. The dynamic mixer of the print head makes it possible to homogenize the two fluids in contact.

The invention also relates to a robot used for the additive manufacturing of architectural structures, comprising a system for positioning the print head, which system is for example an articulated arm controlled by a control unit. The robot therefore comprises a system for extruding cementitious material according to the invention and is designed to move the print head of the extrusion system. The robot is not shown in the figures, but is well known to a person skilled in the art. The particularity of a robot according to the invention is that it implements an extrusion system according to the invention. To do this, the positioning system, such as an articulated arm, of the robot carries the print head of an extrusion system according to the invention and as shown in FIG. 3. Said print head is connected to an admixing device and to the feed circuit and to the storage tank of an extrusion system according to the invention.

The robot is for example a six-axis robot, optionally mounted on rails, optionally on a gantry. The robot may also be a cable robot or any type of robot of which the positioning system, such as an articulated arm, can be controlled by a computer.

A robot according to the invention can be used to manufacture all types of architectural parts. Such an architectural part may be a reinforcing part, a building, and generally any part made of cementitious material. The architectural parts manufactured using an extrusion system according to the invention may be of various scales. This may involve a portion of a post, an entire post, a wall, a slab element, a building, a piece of street furniture, a sculpture, etc.

The invention claimed is:

1. A system for extruding strands of cementitious material used for the additive manufacturing of architectural structures, comprising:

a head for dispensing strands of cementitious material, referred to as a print head, comprising a mouth for the inlet of cementitious material and an outlet nozzle designed to form strands of cementitious material, a circuit for feeding cementitious material to said print head, comprising a cementitious material storage tank, a cementitious material feed pipe connecting said storage tank and said print head, and a pump for filling said feed pipe with cementitious material from said storage tank, a sensor for detecting the pressure/flow rate of said cementitious material flowing in said print head between the mouth and outlet of said print head, which sensor is suitable for transmitting pressure/flow rate measurements to said filling pump, said filling pump being designed to control the filling of the feed pipe on the basis of said measurements transmitted by said sensor, characterized in that said dispensing head further comprises:

a mixing chamber which is arranged upstream of said outlet nozzle and into which an admixing device leads which is suitable for injecting admixtures that modify the characteristics of the cementitious material before ejection of said strands of cementitious material through said outlet nozzle, said admixing device comprising at least one admixing needle which leads into said mixing chamber in an admixing direction which forms an angle of between 0 and 90° with said longitudinal direction and is connected to an admixture barrel so as to be able to inject said admixtures from said admixture barrel into said mixing chamber in said admixing direction, a dynamic mixer designed to be able to mix said cementitious material and admixtures provided by said admixing device in said mixing chamber, said dynamic mixer comprising at least one shaft extending into the mixing chamber in a direction referred to as the longitudinal direction, and carrying radial fingers distributed along the shaft, and a motor designed to be able to rotate an eccentric-screw metering pump designed to be able to convey the cementitious material from said inlet mouth of said print head to said mixing chamber said shaft so as to be able to provide a homogeneous mixture of the cementitious material and the admixtures, an eccentric-screw metering pump designed to be able to convey the cementitious material from said inlet mouth of said print head to said mixing chamber.

2. The extrusion system according to claim 1, characterized in that said admixing device comprises a plurality of needles leading into said mixing chamber in said admixing direction, each needle being connected to said admixture barrel by means of a volumetric feeder.

3. The extrusion system according to claim 2, characterized in that said admixing device comprises a peristaltic pump arranged between the admixture barrel and said volumetric feeders.

4. The extrusion system according to claim 1, characterized in that it comprises a sensor for detecting the pressure of said cementitious material upstream of the mixing chamber, referred to as a safety sensor, which is designed to measure the pressure upstream of said mixing chamber so as to be able to prevent risks of the mixing chamber or the outlet nozzle clogging.

5. The extrusion system according to claim 1, characterized in that said filling pump is an eccentric-screw pump so as to limit the pulsations in said feed pipe.

6. The extrusion system according to claim 1, characterized in that said storage tank of said feed circuit is a hopper comprising an upper opening for receiving batches of cementitious materials and a lower outlet connected to said feed pipe.

7. The extrusion system according to claim 6, characterized in that said hopper is provided with an agitator comprising a shaft carrying a plurality of lateral blades, and a motor for rotating the shaft so as to be able to stir the cementitious material of said hopper.

8. The extrusion system according to claim 1, characterized in that it has a constant cross section from the filling pump to the outlet nozzle so as to be able to convey the cementitious material without generating disturbance zones.

9. A robot used for the additive manufacturing of architectural structures, comprising:

a positioning system, such as an articulated arm, controlled by a control unit, characterized, the positioning system comprising a system for extruding cementitious material comprising:

a head for dispensing strands of cementitious material, referred to as a print head, comprising a mouth for the inlet of cementitious material and an outlet nozzle designed to form strands of cementitious material, a circuit for feeding cementitious material to said print head, comprising a cementitious material storage tank, a cementitious material feed pipe connecting said storage tank and said print head, and a pump for filling said feed pipe with cementitious material from said storage tank, a sensor for detecting the pressure/flow rate of said cementitious material flowing in said print head between the mouth and outlet of said print head, which sensor is suitable for transmitting pressure/flow rate measurements to said filling pump, said filling pump being designed to control the filling of the feed pipe on the basis of said measurements transmitted by said sensor, characterized in that said dispensing head further comprises:

a mixing chamber which is arranged upstream of said outlet nozzle and into which an admixing device leads which is suitable for injecting admixtures that modify the characteristics of the cementitious material before ejection of said strands of cementitious material through said outlet nozzle, said admixing device comprising at least one admixing needle which leads into said mixing chamber in an admixing direction which forms an angle of between 0 and 90° with said longitudinal direction and is connected to an admixture barrel so as to be able to inject said admixtures from said admixture barrel into said mixing chamber in said admixing direction, a dynamic mixer designed to be able to mix said cementitious material and admixtures provided by said admixing device in said mixing chamber, said dynamic mixer comprising at least one shaft extending into the mixing chamber in a direction referred to as the longitudinal direction, and carrying radial fingers distributed along the shaft, and a motor designed to be able to rotate an eccentric-screw metering pump designed to be able to convey the cementitious material from said inlet mouth of said print head to said mixing chamber said shaft so as to be able to provide a homogeneous mixture of the cementitious material and the admixtures, an eccentric-screw metering pump designed to be able to convey the cementitious material from said inlet mouth of said print head to said mixing chamber.

* * * * *